(12) United States Patent
Hussey et al.

(10) Patent No.: US 7,328,277 B2
(45) Date of Patent: Feb. 5, 2008

(54) HIGH-SPEED DATA PROCESSING USING INTERNAL PROCESSOR MEMORY SPACE

(75) Inventors: Terrence Hussey, Merrimack, NH (US); Donald W. Monroe, Carlisle, MA (US); Arnold N. Sodder, Newtonville, MA (US)

(73) Assignee: Enterasys Networks, Inc., Andover, MA (US)

( * ) Notice: Subject to any disclaimer, the term of this patent is extended or adjusted under 35 U.S.C. 154(b) by 571 days.

(21) Appl. No.: 09/798,820

(22) Filed: Mar. 2, 2001

(65) Prior Publication Data

US 2001/0049744 A1 Dec. 6, 2001

Related U.S. Application Data

(60) Provisional application No. 60/186,782, filed on Mar. 3, 2000.

(51) Int. Cl.
*G06F 15/173* (2006.01)

(52) U.S. Cl. ............... 709/238; 709/234; 709/236; 370/389; 370/413

(58) Field of Classification Search ............... 709/234, 709/236, 238; 370/389, 413
See application file for complete search history.

(56) References Cited

U.S. PATENT DOCUMENTS

| | | | |
|---|---|---|---|
| 4,438,488 A | | 3/1984 | Shibayama et al. |
| 5,678,060 A | | 10/1997 | Yokoyama et al. |
| 5,758,195 A | | 5/1998 | Balmer |
| 5,812,549 A | | 9/1998 | Sethu |
| 6,032,190 A | * | 2/2000 | Bremer et al. ............ 709/238 |
| 6,070,003 A | | 5/2000 | Gove et al. |
| 6,101,599 A | | 8/2000 | Wright et al. |
| 6,279,140 B1 | * | 8/2001 | Slane ........................ 714/807 |
| 6,446,196 B1 | * | 9/2002 | Slane ........................ 712/234 |
| 6,650,640 B1 | * | 11/2003 | Muller et al. ............. 370/392 |

FOREIGN PATENT DOCUMENTS

| | | |
|---|---|---|
| EP | 0 719 065 A1 | 6/1996 |
| JP | 63142449 | 6/1988 |

OTHER PUBLICATIONS

Aweya, J., "On the design of IP routers Part 1: Router architectures", Journal of Systems Architecture 46, 2000, pp. 483-511.

* cited by examiner

*Primary Examiner*—Phuoc Nguyen
(74) *Attorney, Agent, or Firm*—Lowrie, Lando & Anastasi, LLP

(57) ABSTRACT

Significant performance improvements can be realized in data processing systems by confining the operation of a processor within its internal register file so as to reduce the instruction count executed by the processor. Data, which is sufficiently small enough to fit within the internal register file, can be transferred into the internal register file, and execution results can be removed therefrom, using direct memory accesses that are independent of the processor, thus enabling the processor to avoid execution of load and store instructions to manipulate externally stored data. Further, the data and execution results of the processing activity are also accessed and manipulated by the processor entirely within the internal register file. The reduction in instruction count, coupled with the standardization of multiple processors and their instruction sets, enables the realization of a highly scaleable, high-performing symmetrical multi-processing system at manageable complexity and cost levels.

17 Claims, 8 Drawing Sheets

HIGH-SPEED DATA PROCESSING USING INTERNAL PROCESSOR MEMORY SPACE

CROSS-REFERENCE TO RELATED APPLICATIONS

This claims priority to and the benefit of U.S. provisional patent application No. 60/186,782, filed Mar. 3, 2000, the entirety of which is incorporated herein by reference.

FIELD OF THE INVENTION

The present invention relates generally to information processing, and in particular to the processing activity occurring within internal elements of processors.

BACKGROUND OF THE INVENTION

Data processing typically involves retrieving data from a memory, processing the data, and storing the results of the processing activity back into memory. The hardware architecture supporting this data processing activity generally controls the flow of information and control among individual hardware units of an information processing system. One such hardware unit is a processor or processing engine, which contains arithmetic and logic processing circuits, general and special purpose registers, processor control or sequencing logic, and data paths interconnecting these elements. In some implementations, the processor may be configured as a stand-alone central processing unit (CPU) implemented as a custom-designed integrated circuit or implemented in an application specific integrated circuit (ASIC). The processor has internal registers for use with operations that are defined by a set of instructions. The instructions are typically stored in an instruction memory and specify a set of hardware functions that are available on the processor.

When implementing these functions, the processor generally retrieves "transient" data from a memory that is external to the processor, sequentially or randomly loads portions of the data into its internal registers by executing "load" instructions, processes the data in accordance with the instructions, and then stores the processed data back into the external memory using "store" instructions. In addition to loading the transient data into and removing the execution results out of the internal registers, load and store instructions are also frequently used during the actual processing of the transient data in order to access additional information required to complete the processing activity (e.g., accessing status and command registers). Frequent load/store accesses to an external memory is generally inefficient because the execution capability of a processor is substantially faster than its external interface capability. Consequently, the processor often idles while waiting for the accessed data to be loaded into its internal register file.

This inefficiency can be particularly limiting in devices that operate within communication systems, since the net effect is to constrain the overall data handling capacity of a device and, unless some data is to be dropped rather than transmitted, the maximum data rate of the network itself.

SUMMARY OF THE INVENTION

The present invention recognizes that frequent accesses to external memory are not necessary for processing a data set that is small enough to be contained within the local register file space of a processor assigned to process the data set. Accordingly, the present invention incorporates data access techniques that are performed, at least in part, independently of the processor and which avoid execution of load and store instructions by the processor.

In one embodiment, an information processing system and method, incorporating aspects of the present invention, confines the operations of a processor assigned to process a data set within the processor's internal register file. The information processing system comprises a processor, an ingress element, and an egress element. The ingress element receives unprocessed data from an interface to a data source corresponding, for example, to a network interface receiving data from a communications network. The ingress element delivers the unprocessed data, or portions thereof, to the internal register file space of the processor by directly accessing the internal register file space. A unit for manipulating data within the processor (e.g., an arithmetic logic unit) manipulates and processes the data in response to the transfer of the data to the processor's register file and confines its operations entirely within its internal register file space. Upon completion of the processing activity, the egress element directly accesses and removes the processed data from the internal register file space. Alternatively, an intermediate state machine directly accesses the processed data and transfers it to the egress element.

In one aspect of the invention, one or more state machines are contained within and govern the operation of the ingress and egress elements. One or more state machines are also contained within the processor. The state machines directly access the processor's internal register file space in order to deliver data thereto or remove data therefrom. In one embodiment, the data transfer activities of the state machines are initiated in response to a) receipt of the unprocessed data at the ingress element, b) a signal by processor logic indicating the transfer of unprocessed data into the register file space of the processor, and/or c) a change in the value stored in a logic element, such as a command register.

The benefits of the present invention can be realized in a number of information processing systems, such as those focused on image processing, signal processing, video processing, and network packet processing. As an illustration, the present invention can be embodied within a communication device, such as a router, to implement network services such as route processing, path determination, and path switching functions. The route processing function determines the type of routing needed for a packet, whereas the path switching function allows a router to accept a packet on one interface and forward it on a second interface. The path determination function selects the most appropriate interface for forwarding the packet.

The path switching function of the communication device can be implemented within one or more forwarding engine ASICs, incorporating aspects of the present invention, to support the transfer of packets between a plurality of interfaces of the communication device. In this illustrative embodiment, packet data is received by ingress logic associated with a particular input port of a network interface of the communication device via a communications network. A processor is then selected by the ingress logic from a pool of candidate processors associated with the receive port to process the packet.

Once the processor has been allocated, the packet is split into header and body portions. The packet header is written into a fixed location within a memory element, such as the internal register file associated with the allocated processor, by at least one state machine of the ingress logic that is configured to write the packet header using direct memory/ register accesses and without the processor invoking load or store instructions. The packet body is written to an output buffer. The processor then processes the packet header according to locally stored instructions (again, without invoking load or store instructions) and transfers the processed packet header to a selected output buffer where it is integrated with the packet body and subsequently transferred to a destination output port for transmission from the communication device.

Prior to receiving the packet header, the allocated processor repetitively executes an instruction stored at a first known location/address in the processor's instruction memory (e.g., address 0) in an infinite loop. Hardware in the processor detects address 0 to be a "special" address for which hard-wired instructions are returned, rather than instructions from the instruction memory coupled to the processor. When a packet header is transferred to the processor from the ingress logic, a control signal indicates to the processor that the header transfer is in progress. While this signal is active, the processor hardware forces the processor program counter to a nonspecial address (e.g., address 2), which terminates execution of the infinite loop. Upon completing the transfer of the packet header, the processor begins executing instructions beginning at address 2 of its instruction memory. Once the packet processing activity is complete, the processor is reset (e.g., sets the program counter to address 0) to repetitively execute instructions at the special address discussed above.

In this manner, the packet header is directly written to the register file of the processor, without requiring any interaction or prior knowledge by the processor until it is ready to process the packet header. Other information relating to the status or characteristics of the packet (e.g., length) can also be stored locally in the register file using a similar procedure so that the processor need not access an external source to obtain this information.

To simplify the programming model for multiple processors, a single processor can be allocated for each packet with each of the processors configured to execute a common series of instructions within their respective instruction memories. Enough processors are assigned to ensure that the packets can be processed at the wire/line rate (i.e. maximum bit-rate of the network interface) of the communications network. The reduced instruction set realized when incorporating aspects of the present invention in a plurality of processors in an ASIC reduces the die size of the ASIC, thus enabling a greater density in the number of processors in the ASIC without encountering technological barriers and adverse yield results in the manufacturing of such an ASIC. The ASIC implementation of the present invention is further scaleable, for example, by increasing the clock rate of the processors, by adding more processors to the ASIC, and by aggregating pools of processors (with common instruction sets) from multiple ASICs.

In one embodiment, the present invention can be used in a symmetric multi-processing (SMP) system, exhibiting a reduced instruction set computer (RISC) architecture, to process packets received over a communications network. The SMP system comprises a plurality of identical processors with common software operating as a pool, any of which is eligible to process a particular packet. Each incoming packet is assigned to an available processor in the pool, and the processors process the packets in parallel using a common instruction set. The SMP system reconstructs the processed packet stream so that it exhibits the proper packet order.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE INVENTION

Figure 1:
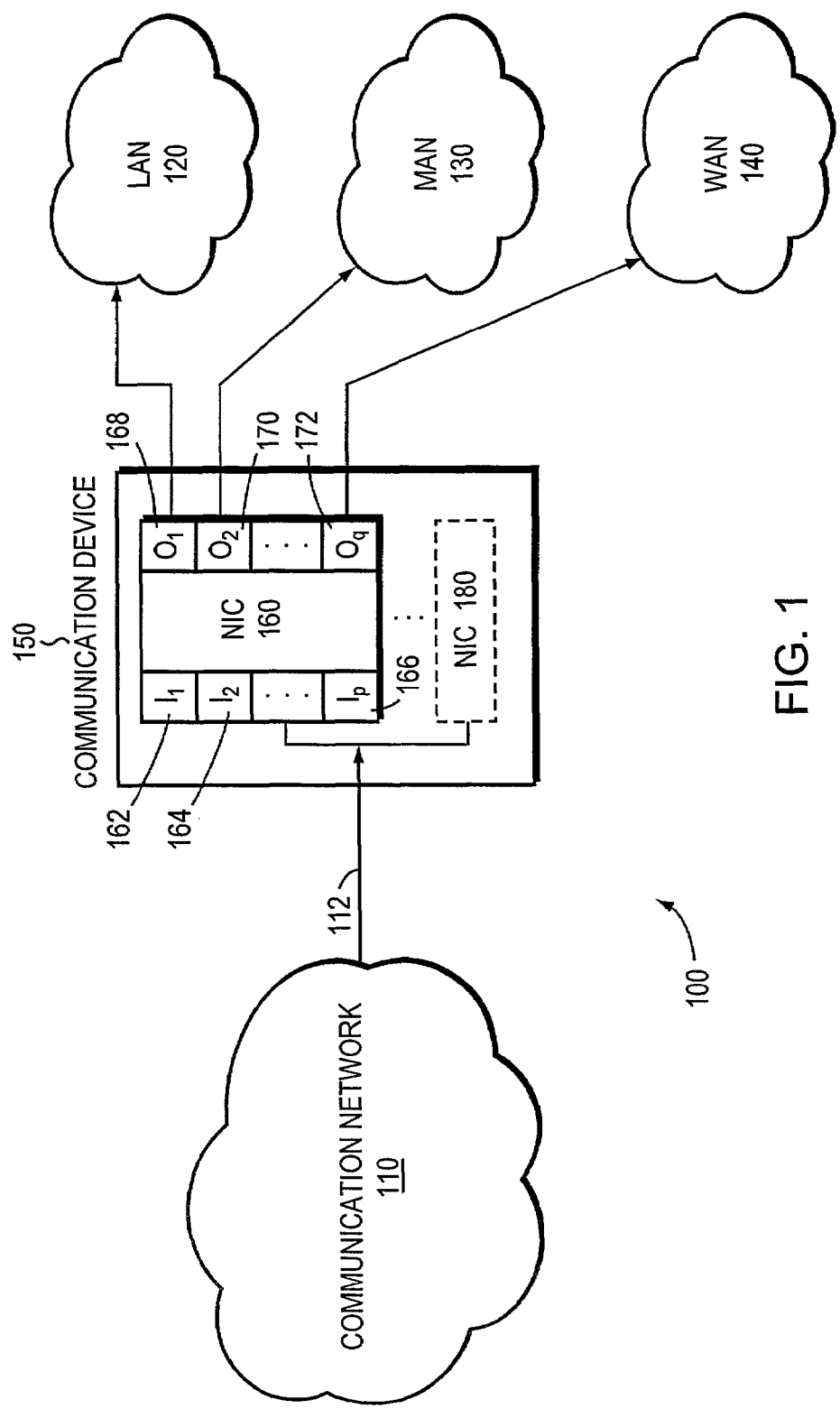
FIG. 1 schematically illustrates a communication device coupling a communication network to other networks, such as LANs, MANs, and WANs.

Typical microprocessors execute load and store instructions to load temporary images of data that represent data structures stored in memory elements external to the processor into the processor's local register file for further execution. As used herein, the term "local register file" means the totality of registers within the internal structure of the processor that are available for use in manipulating data. A "register" refers to a distinct group of storage elements, such as D flip-flops. Depending on processor design, the register file space can be composed of a combination of memory and flip-flops. In any event, the register file is typically implemented using high-speed memory components that provide multiple read and write ports which are independently accessible. During execution of a software program, the typical processor executes a relatively large number of load/store instructions to move data from external memory to the local register file and to move execution results from the local register file to external memory. These frequent accesses to external memory are necessitated because the data set to be processed is too large to fit into the local register file's execution space.

The present invention recognizes that frequent accesses to external memory are not necessary for processing data sets that are small enough (e.g., 128 to 512, 8-bit data elements) to be positioned entirely within the local register file space. As described in detail below, the present invention incorporates direct memory access (DMA) and direct register access (DRA) techniques to position data and execution results into and out of a processor's register file without the need for the processor to execute instructions, such as load and store instructions, to move the data. In this context, DMA refers to a method which uses one or more state machines to move a block of data into and out of internal or external memory independently of the processor. Similarly, DRA refers to a particular type of DMA, namely, one involving movement of one or more blocks of data into and out of the processor's register file space independently of the processor. In one embodiment, a region of the register file is allocated as a five-port register file space with two write ports and three read ports (as opposed to the normal three-port register file space with one write and two read ports) in order to facilitate direct register file accesses. This approach avoids accesses to external memory that are relatively slow (compared to operations within the register file), avoids memory wait states, and reduces the size of the processor's instruction set. Consequently and in addition to significantly increasing the performance of an individual processor, the die size and power consumption of an application specific integrated circuit (ASIC) containing such processors can be reduced and the overall number of processors in the ASIC can be significantly increased without incurring unsustainable costs.

Although the present invention will hereafter be described as being implemented in a network interface card of a communication device for the purpose of processing packets received over a network, this particular implementation is merely an illustrative embodiment and those skilled in the art will recognize any number of other embodiments and applications that can benefit from the claimed invention. For example and without limitation, the present invention can benefit information-processing applications involving relatively small data sets, such as those present in image processing, signal processing, and video processing. The present invention can also be implemented in a wide variety of network communication devices (e.g., switches and routers) and other information-processing environments.

With reference to FIG. 1, a communication device 150 receives information (e.g., in the form of packets/frames, cells, or TDM frames) from a communication network 110 via a communication link 112 and transfers the received information to a different communication network or branch such as a Local Area Network (LAN) 120, Metropolitan Area Network (MAN) 130, or Wide Area Network (WAN) 140 or to a locally attached end station (not shown). The communication device 150 can contain a number of network interface cards (NICs), such as NIC 160 and NIC 180, each having a series of input ports (e.g., 162, 164, and 166) and output ports (e.g., 168, 170, and 172). Input ports 162, 164, and 166 receive information from the communication network 110 and transfer them to a number of packet processing engines (not shown) that process the packets and prepare them for transmission at one of the output ports 168, 170, and 172, which correspond to a communication network such as the LAN 120, MAN 130, or WAN 140 containing the end station.

Figure 2:
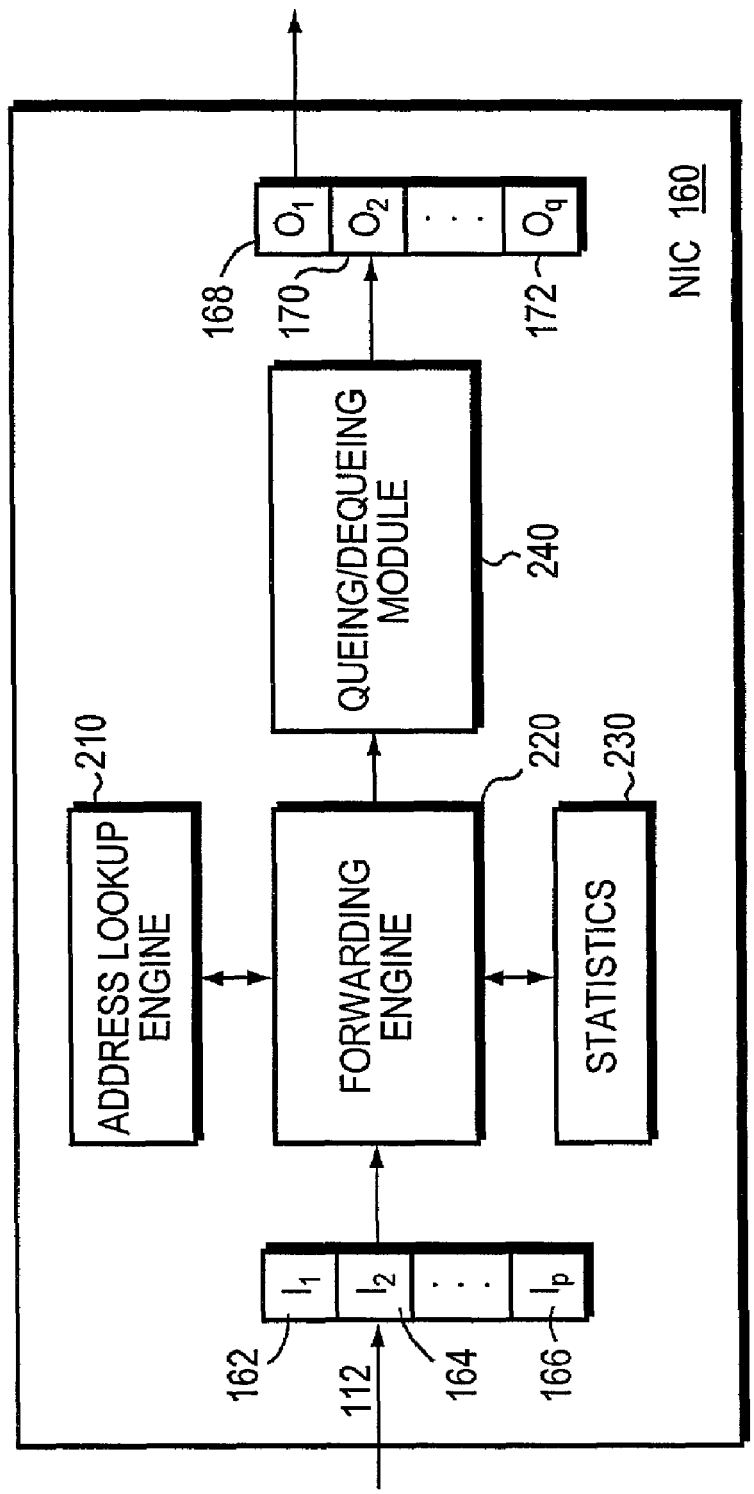
FIG. 2 schematically illustrates several components of a network interface card installed within the communication device of FIG. 1, in accordance with an embodiment of the present invention.

With reference to FIG. 2, the network interface card (NIC) 160 embodying aspects of the present invention includes input ports 162, 164, 166, a packet processing or forwarding engine 220, an address lookup engine (ALE) 210, a statistics module 230, a queuing/dequeuing module 240, and output ports 168, 170, 172. The NIC 160 receives packets from the packet-based communication network 110 (FIG. 1) at input ports 162, 164, 166. The forwarding engine 220, together with the ALE 210, determine the destination output ports of the packets by looking up the appropriate output ports 168, 170, 172 associated with that destination, and prepending forwarding vectors onto the packets to aid in routing them to the appropriate output ports.

The modified packets are delivered to the queuing/dequeuing module 240 where the forwarding vectors are used to organize the packets into queues associated with a particular destination output port 168, 170, 172. The forwarding vectors of each packet are then removed and the packets are scheduled for transmission to the selected output ports 168, 170, 172. The packets are subsequently transmitted from the selected output ports 168, 170, 172 to a communication network such as the LAN 120, MAN 130, or WAN 140. In one embodiment, the queuing/dequeuing module 240 of the NIC 160 receives the modified packets via a full-mesh interconnect (not shown) so that it can funnel packets originally received at the input ports of any NIC 160, 180 installed within the communication device 150, including the packets received by the input ports 162, 164, 166 of its own NIC 160, to one or more of the output ports 168, 170, 172 of its own NIC 160. In another embodiment, packets received at input ports 162, 164, 166 are transferred directly to the queuing/dequeuing module 240 by the forwarding engine 220.

Figure 3:
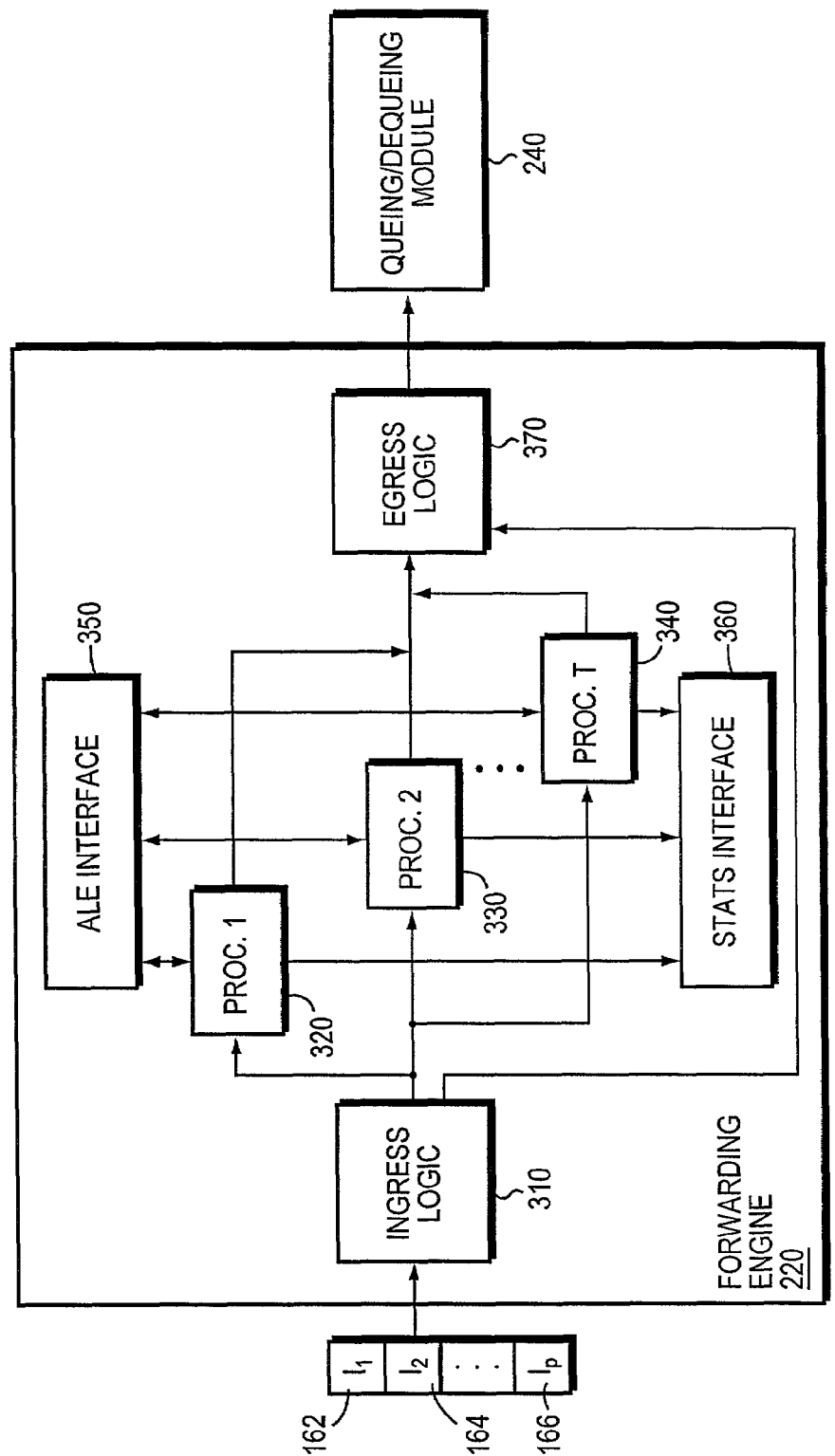
FIG. 3 schematically illustrates several components of a forwarding engine, which form a portion of the network interface card of FIG. 2, in accordance with an embodiment of the present invention.
Figure 4:
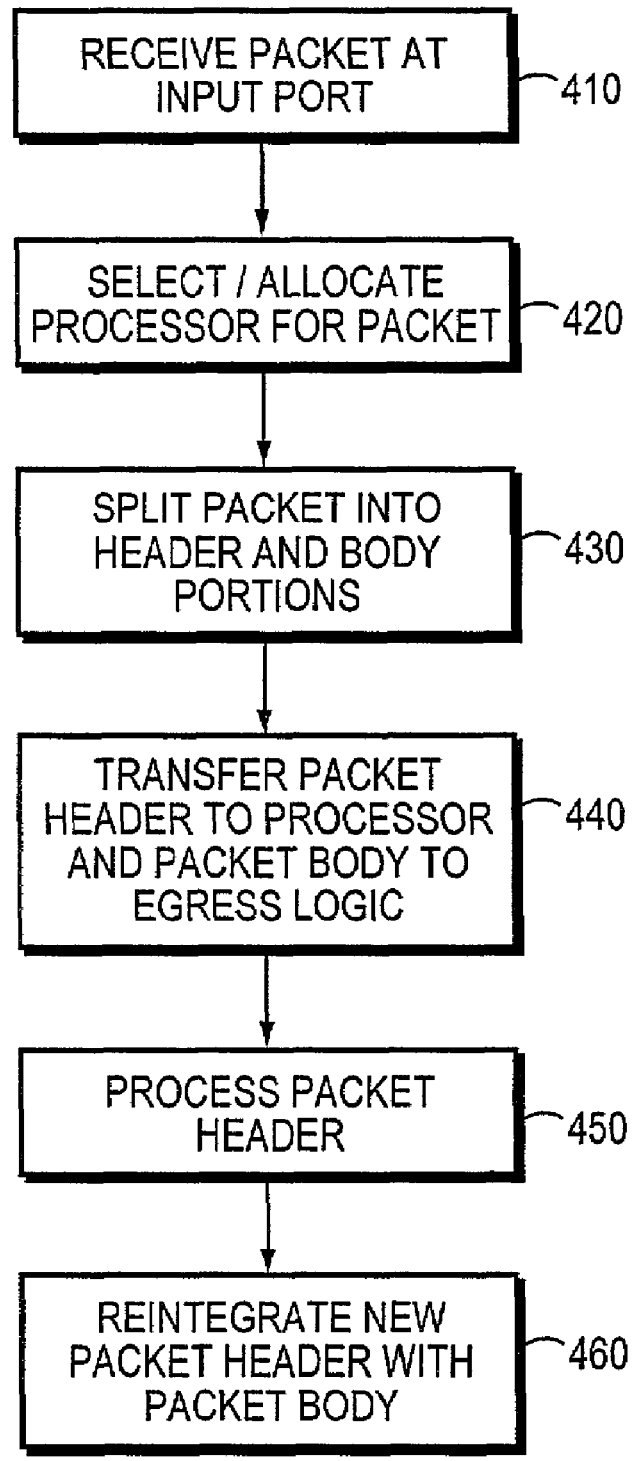
FIG. 4 provides a flow diagram of the steps performed when operating the forwarding engine of FIG. 3, in accordance with an embodiment of the present invention.

With reference to FIGS. 3 and 4, an illustrative embodiment of the structure of the forwarding engine 220 comprises ingress logic 310, an ALE interface 350, a statistics interface 360, egress logic 370, and one or more processors representatively shown at 320, 330, 340. In operation, data corresponding to a packet is transmitted over communications network 110 and is received at a particular input port 162, 164, or 164 of NIC 160 or 180 that is coupled to the communications network 110 (step 410). A processor 330 is then selected from a pool of processors (representatively indicated at 320, 330, 340) associated with the input port 162, 164, or 166 to process the packet (step 420). Once the processor 330 has been allocated, the packet is split into header and body portions by the ingress logic 310 (step 430). The packet header is written into a particular location within a register file 710 (FIG. 7) associated with the processor 330 using direct register accesses and the packet body is written to an output buffer in the egress logic 370 using direct memory accesses (step 440). The processor 330 then processes the packet header according to locally stored instructions (step 450) and transfers the processed packet header to the egress logic 370 where it is reintegrated with the packet body (step 460).

The processor 330 may perform such tasks as processing the packet header by checking the integrity of the packet header, verifying its checksum, accessing the statistics module 230 via the statistics interface 360 to provide statistics that are used to report the processing activity involving this packet header to modules external to the forwarding engine 220, and communicating with the ALE 210 via the ALE interface 350 to obtain routing information for one of the output ports 168, 170, 172 associated with the destination of the packet. Additional network specific (e.g., IP, ATM, Frame Relay, HDLC, TDM) packet processing may be done at this time. At the conclusion of this processing activity, the processor 330 modifies the packet header to include routing information (e.g., by prepending a forwarding vector to the packet header) that designates a particular output port 168, 170, 172 of the NIC 160. The modified packet header is then written to the egress logic 370 of the forwarding engine 220 where it is subsequently routed to the queuing/dequeuing module 240 as discussed above.

The ALE Interface 350, Statistics Interface 360 and egress logic 370 are resources within the forwarding engine 220 that are shareable among the processors 320, 330, 340. An arbitration mechanism (not shown) is provided in the forwarding engine 220 to arbitrate between the processors 320, 330, 340 for access to these resources 350, 360, 370. In one embodiment, when the processor 330 is allocated to the packet, a processor identifier, such as the processor number, for the processor 330 is communicated to each of the three shared resources 350, 360, 370 identified above. Each of these shared resources 350, 360, 370 then writes the processor number to a FIFO, which preferably has a depth equal to the total number of processors in the forwarding engine 220. Logic in each of the shared resources 350, 360, 370 accesses its respective FIFO to determine which of the processors 320, 330, or 340 should be granted access to the resource next. Once the granted processor completes its access to a particular resource 350, 360, 370, the accessed resource reads its next FIFO entry to determine the next processor to which a grant will be issued.

Figure 5:
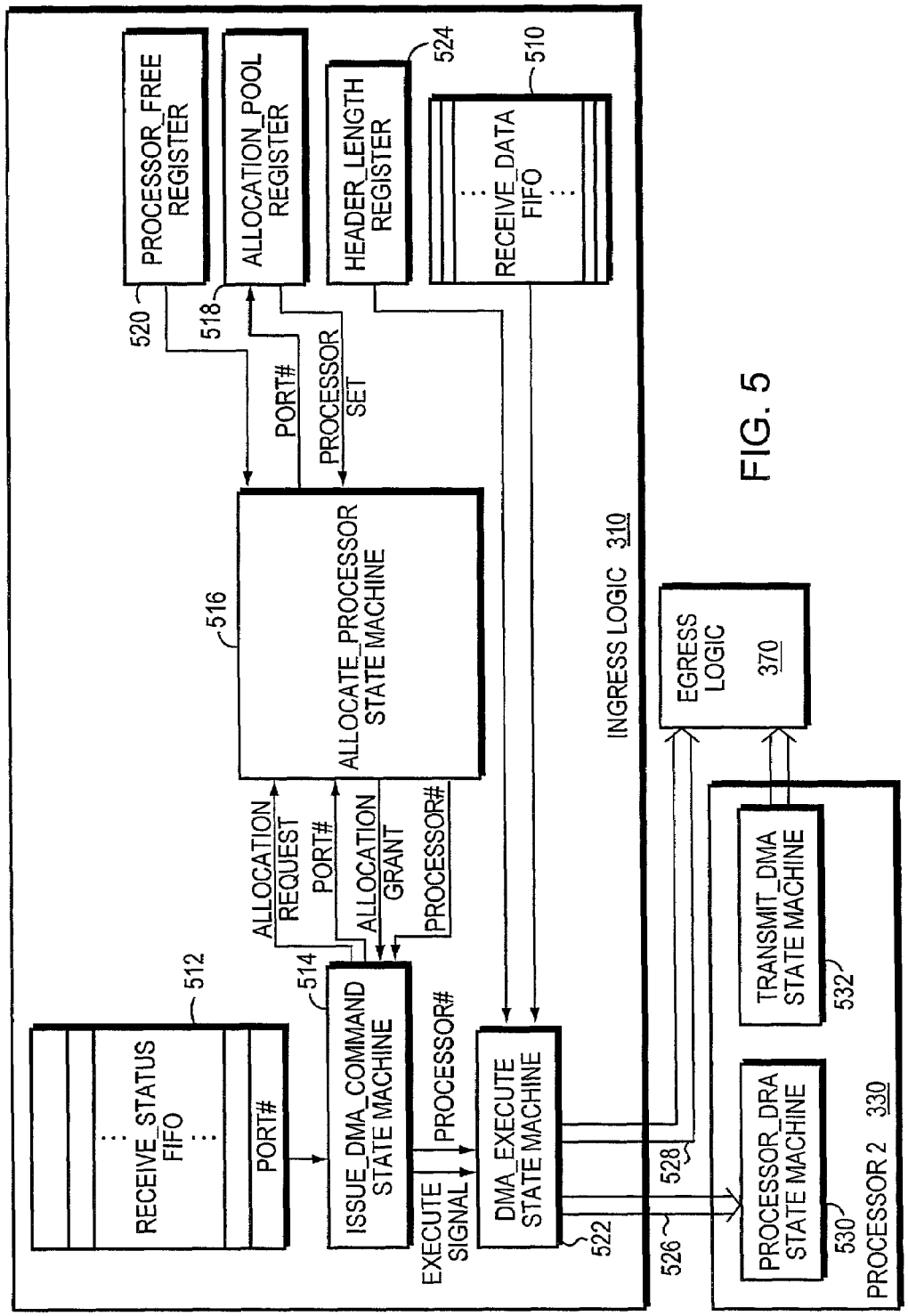
FIG. 5 schematically illustrates several components of the ingress logic and processor of the forwarding engine of FIG. 3 that perform direct memory and direct register accesses, in accordance with an embodiment of the present invention.
Figure 6:
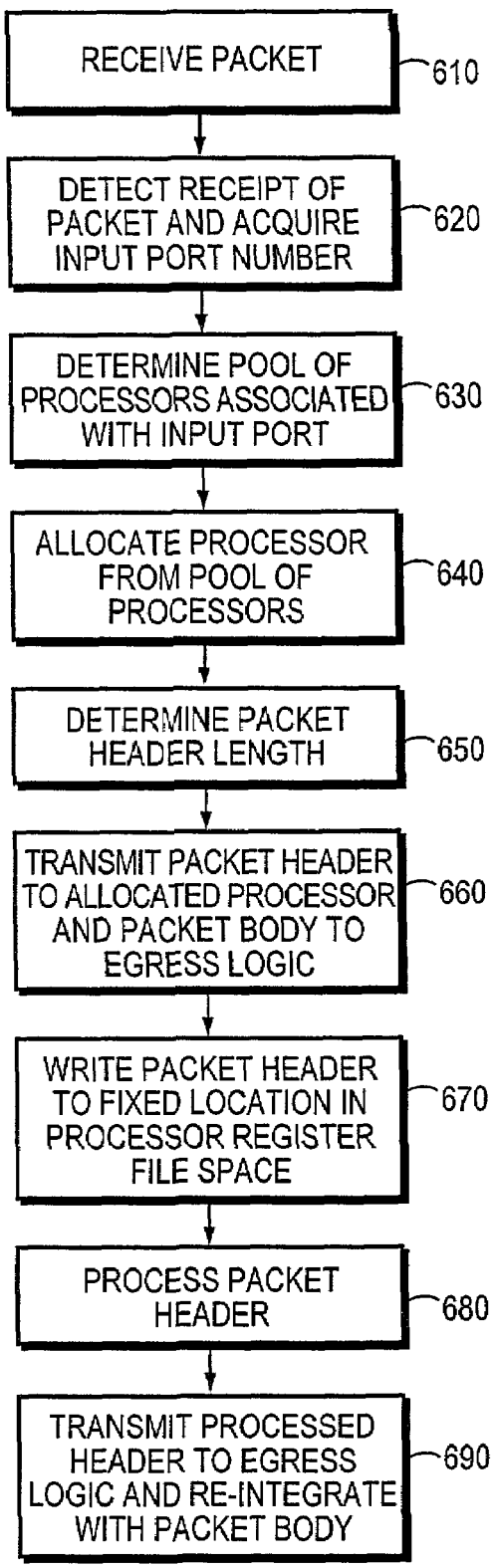
FIG. 6 provides a flow diagram of the steps performed during the operation of the ingress logic and processor of FIG. 5, in accordance with an embodiment of the present invention.

More particularly and with reference to FIGS. 5 and 6, the receipt, manipulation, and transfer of the packet data within the forwarding engine 220 is handled primarily by a plurality of DMA and DRA state machines. In one illustrative embodiment, these state machines are contained within the ingress logic 310 and the processor 330. During the operation of this illustrative embodiment, a packet is received from one of the input ports 162, 164, 166 of the NIC 160 and stored within a Receive_Data FIFO (First In/First Out buffer) 510 in the Ingress Logic 310 (step 610). A Receive_Status FIFO 512 records the particular input port 162, 164, or 164 at which the packet arrived and maintains an ordered list of input port numbers for each packet received by the forwarding engine 220, which is sorted in accordance with when the packet was received.

An Issue_DMA_Command state machine 514 detects when the Receive_Status FIFO 512 contains data and acquires the input port number associated with the input port 162, 164, or 166 that received the packet from the Receive_Status FIFO 512 (step 620). The Issue_DMA_Command state machine 514 then sends a processor allocation request that contains the port number of the packet to an Allocate_Processor state machine 516, which accesses an Allocation_Pool Register 518 associated with that port number to determine a set of processors 320, 330, 340 that are candidates to operate on this packet (step 630). The Allocate_Processor state machine 516 then accesses a Processor_Free Register 520 to determine if any of the candidate processors 320, 330, 340 identified by the Allocation_Pool Register 518 are available for use. The Allocate_Processor state machine 516 subsequently allocates one of the available processors 330 from the set of candidate processors 320, 330, 340 to process the packet (step 640) and sends the allocation grant and processor number of that processor 330 to the Issue_DMA_Command state machine 514.

Upon receipt of the processor number associated with the allocated processor 330, the Issue_DMA_Command state machine 514 sends an execute signal/command that contains the processor number to a DMA_Execute state machine 522, which accesses a Header_DMA_Length Register 524 to obtain the amount of the received packet that is to be sent to the processor 330 (i.e., the length of the packet header) (step 650). The DMA_Execute state machine 522 then issues a DMA command, which retrieves the header portion of the packet (corresponding to the packet header) from the Receive_Data FIFO 510 and transfers it on a DRA bus 526 where it is received by a Processor_DRA state machine 530 contained within the processor 330 (step 660). The DMA_Execute state machine 522 also issues a DMA command that retrieves the packet body from the Receive_Data FIFO 510 and transfers it on another DMA bus 528 for receipt by a buffer (not shown) of the egress logic 370 (step 660). The Processor_DRA state machine 530 subsequently writes the packet header data received via the DRA bus 526 directly to a register file region starting at a fixed address location (e.g., address 0) in the register file space 710 (FIG. 7) of processor 330 (step 670). The processor 330 then processes the packet header (Step 680) and transmits the processed header to the egress logic 370 for reintegration with the packet body (step 690) via the Transmit_DMA state machine 532.

Figure 7:
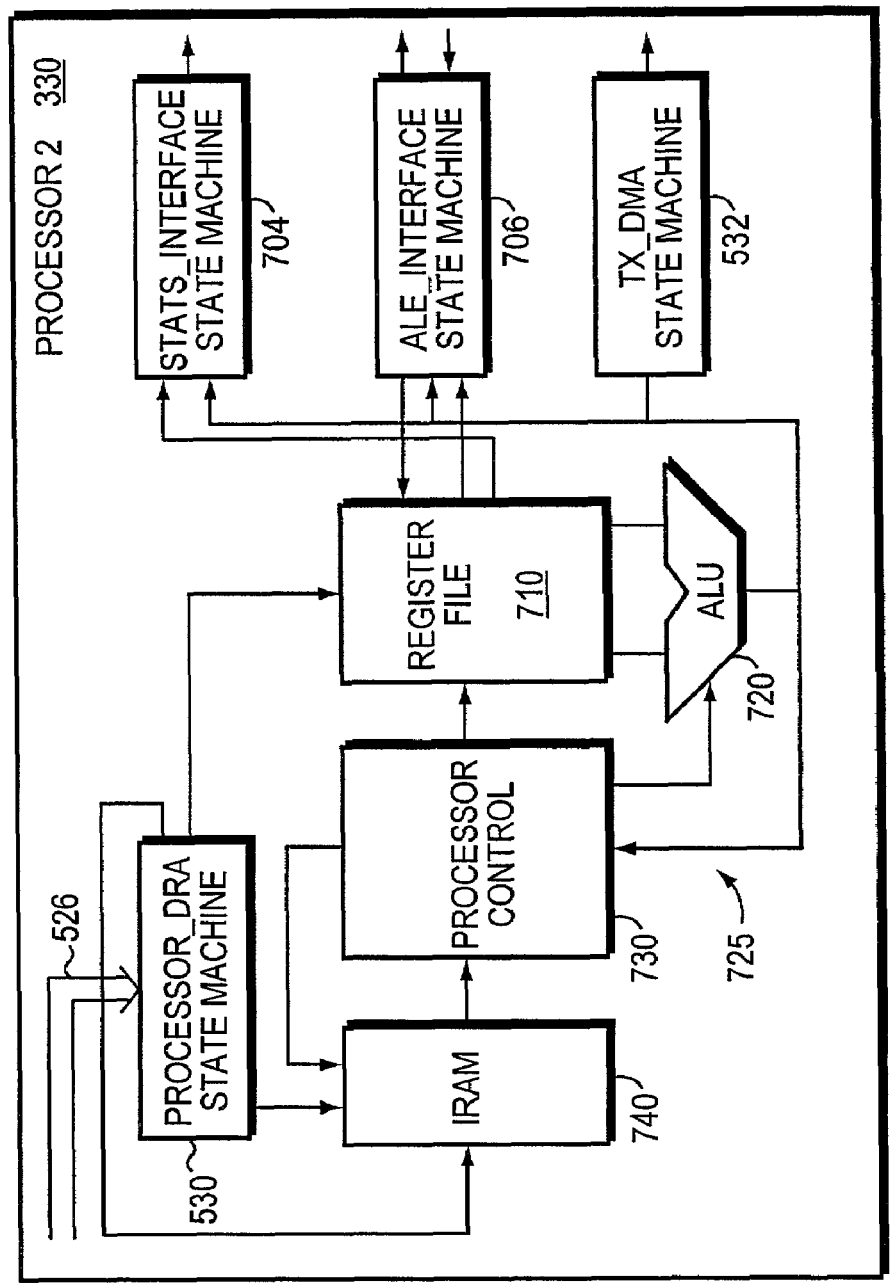
FIG. 7 schematically illustrates a more detailed set of components that form the processor of FIG. 5, in accordance with an embodiment of the present invention.
Figure 8:
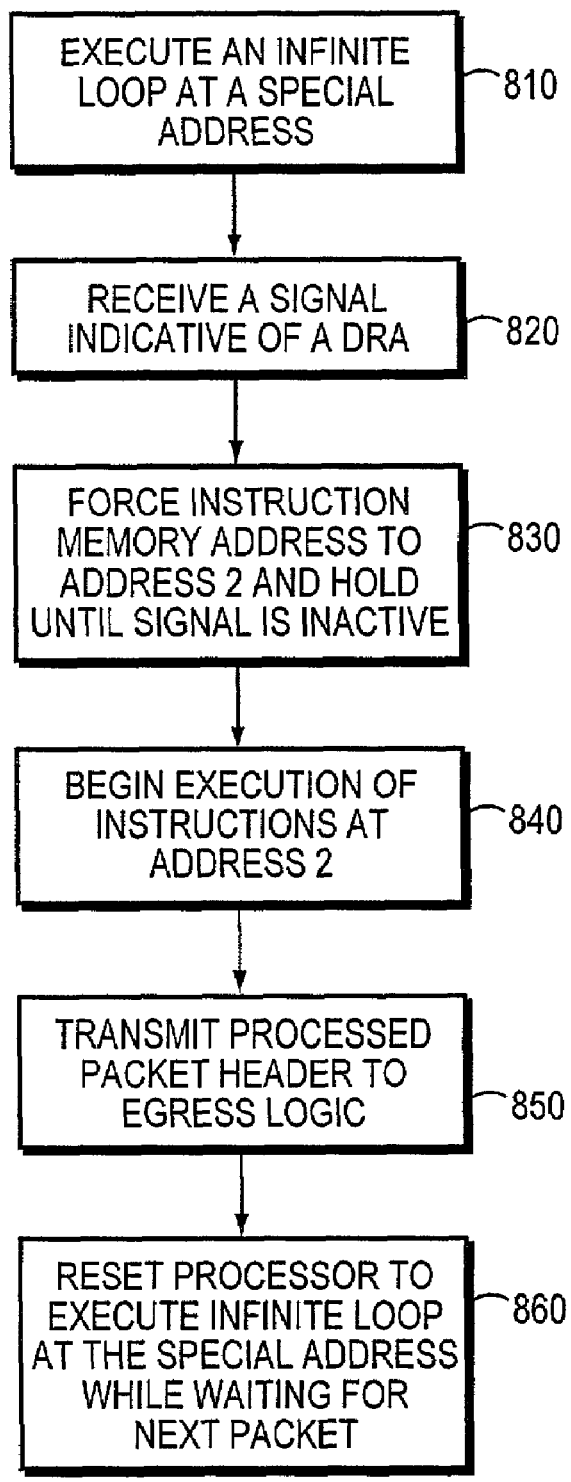
FIG. 8 provides a flow diagram of the steps performed when operating the processor components depicted in FIG. 7, in accordance with an embodiment of the present invention.

More particularly and with reference to FIGS. 7 and 8, the processing of the packet header in processor 330 is preferably such that the processor's instructions and activities are confined to the manipulation of data and execution results in the execution space formed within the processor's local register file 710. The structure of the processor 330 in one illustrative embodiment comprises the Stats_Interface state machine 704, the ALE_Interface State Machine 706, the Processor_DRA state machine 530, the Transmit_DMA state machine 532, the register file 710, an arithmetic logic unit (ALU) 720, a processor control module 730, and an instruction memory 740. The computational unit 725 is comprised of the processor control 730 and the ALU 720.

During the operation of this illustrative embodiment and while the processor 330 is awaiting receipt of a packet header, the computational unit 725 continually executes an instruction at a special address (e.g., address 0) in the instruction memory 740 (i.e., in an infinite loop) (step 810). Hardware in the processor 330 detects address 0 to be a special address in which the instruction is returned from "hard-wired" instruction values etched in silicon rather than from instructions stored in instruction memory 740. In one possible implementation, accessing the instruction at special address 0 returns a "JMP 0" (or jump to address 0 instruction), thereby causing the processor 330 to execute an infinite loop at that address.

When a packet header is transferred to the processor's register file 710 from the ingress logic 310, a control signal from the Processor_DRA state machine 530 indicates to the processor control module 730 that the packet header transfer is in progress (step 820). While this signal is active, the processor control module 730 forces a processor program counter (not shown) to specify a non-special address (e.g., address 2) of the instruction memory 740 and thus cause the computational unit 725 to break out of the infinite loop being executed at special address 0 and wait until the signal becomes inactive (step 830). The computational unit 725 begins execution of the instruction at address 2 in response to the signal becoming inactive (step 840). Address 2 of the instruction memory 740 can be configured to hold the first instruction that will be used to process the packet header in the register file 710 (i.e., the instruction at address 2 corresponds to the beginning of the "real" software image that has been previously downloaded to operate on packet headers). When the Processor_DRA state machine 530 completes the writing of the packet header beginning at a fixed location in the register file 710 (occurring when the control signal goes inactive), the computational unit 725 continues to normally execute the remaining instructions (i.e., beyond address 2) in the instruction memory 740. Specific instructions in the instruction memory 740 specify locations within the register file 710. Upon completion of the processing activity on a particular packet header, the executing software "jumps" to address 0, thus executing the instruction at address 0 in an infinite loop. This technique illustrates one particular implementation of how the processor 330 can be triggered to process the packet header stored in the register file 710 without using load and store instructions.

In another embodiment, the allocated processor 330 remains idle (i.e., not accessing instruction memory or executing instructions) until it receives a signal from an external state machine indicating that the register file 710 has been populated with the complete packet header. The computational unit 725 then executes code from instruction memory 740 to process the packet header. Triggering events can, for example, include when a control signal goes inactive. Alternatively, the allocated processor 330 is triggered when the DRA transfer has been initiated, completed, or when it is in process. Numerous other triggering events will be apparent to those skilled in the art.

As discussed earlier, the processor 330 accesses one or more shared resources (e.g. see FIG. 3, ALE Interface 350, Statistics Interface 360, and egress logic 370) that are external to the processor 330 during the processing of the packet header. For example, the processor 330 interacts with the ALE 210 (FIG. 2) via the ALE Interface 350 (FIG. 3) to issue searches of the ALE 210 and to receive search results therefrom. These interactions with the ALE 210 performed by the processor 330 also occur without the processor 330 having to execute load and store instructions.

In one aspect and while executing the instructions in the instruction memory 740, the processor 330 composes a search key starting at a predefined address in the register file 710. The computational unit 725 executes an instruction which involves writing a value to the ALE_Command Register that specifies the amount of search key data to transmit to the ALE 210. This value effectively serves as a control line to the ALE_Interface state machine 706 of the processor 330 and thus triggers the ALE_Interface state machine 706 to read the value or other data from the ALE_Command Register, to determine the amount of data to be transferred, and to transfer the specified data to the ALE Interface 350 using direct memory accesses that are independent of the computational unit 725. While the processor 330 awaits the results of the search to be returned, it can perform other functions, such as verifying the network protocol (e.g., IP) checksum of the packet header. When the search results from the ALE 210 are available, they are transmitted to the ALE_Interface state machine 706 via the ALE Interface 350. The ALE Interface state machine 706 writes the search results to a predetermined location of the register file 710 using one or more direct register accesses and signals the computational unit 725 when the write is complete. The computational unit 725 subsequently modifies the packet header in response to the search results.

The processor 330 can also issue a statistics update command by writing an address and length value into the Statistics Update_Command Register (not shown) of the processor 330. The Statistics_Interface state machine 704 of the processor 330 is triggered to read the data from the Statistics_Update_Command Register, to determine the source and amount of data to transfer, and to transfer the specified data to the Statistics Interface 360 using direct memory accesses that are independent of the computational unit 725.

Similarly, when the processor 330 has completed processing the packet header, the computational unit 725 writes the processed packet header to the Transmit_DMA state machine 532 of the processor 330, which transfers the processed header to a buffer in the egress logic 370 using direct memory accesses that are independent of the processor 330 (step 850). After all processing is complete, the software executing in processor 330 jumps back to address 0 of the instruction memory 740 and begins executing the infinite loop instructions discussed previously while waiting for the next packet header to arrive (step 860).

More particularly, upon completion of the processing activity, the packet header may not necessarily reside in a contiguous region of the register file 710 and thus the computational unit 725 may have to specify the location of each piece of the processed packet header in the register file 710. Accordingly, the computational unit 725 issues one or more writes to a Move DMA_Command Register (not shown) that specify the start address and length of each piece of the processed packet header. These writes are stored in a FIFO, essentially as a list of reassembly commands. After the data for all of the pieces of the fragmented packet header are obtained, the computational unit 725 writes to a Transmit_DMA_Command Register (not shown) and specifies the body length of the packet along with other data.

The value written to the Transmit_DMA_Comand Register triggers the Transmit_DMA state machine 532 within the processor 330 to begin assembly of the packet header in accordance with the reassembly commands stored in the FIFO referenced above. The Transmit_DMA state machine 532 then transmits the assembled packet header, along with some control information (including the length of the packet body), to the egress logic 370 using direct memory accesses that are independent of the computational unit 725. The egress logic 370 concatenates the processed packet header received from the Transmit_DMA state machine 532 with the packet body stored in a FIFO of the egress logic 370 and subsequently transmits the reconstituted packet to the queuing/dequeuing module 240 as previously discussed.

In order to properly reconstitute the packet header with the packet body, the processor 330 obtains the length of the overall packet from data embedded within the packet header itself and obtains the length of the packet header from data transferred to the processor 330 by the Receive_Data FIFO 510 (FIG. 5) (corresponding to the same value that was written to the Header_Length Register 524 of FIG. 5). Based upon this information, the processor 330 calculates the amount of packet body data that was previously transferred to the output FIFO in the egress logic 370 and specifies the length of the packet body as control information to be transmitted to the egress logic 370 by the Transmit_DMA state machine 532. In this manner, the processor 330 is able to specify the amount of packet body data to pull from the output FIFO of the egress logic 370 that will be appended to the newly-assembled packet header formed by the processor 330 to reconstitute the modified packet. In order to properly reconstitute the modified packet, the processor 330 is granted access to the egress logic 370 in the same order in which the processor 330 was allocated (and thus in the same order as packet bodies were written to the output FIFO of the egress logic 370).

Aspects of the present invention afford great flexibility in the assignment of compute resources to input packet processing requirements. Assuming for illustrative purposes that there are a total of 40 processors 320, 330, 340 within the forwarding engine 220, the processors 320, 330, 340 can be flexibly allocated to meet the packet processing needs of a multitude of input/output port configurations. For example, in a NIC 160 where there is only a single logical input port (i.e., port 0), all 40 processors 320, 330, 340 could be allocated to process packets for that single port. In this scenario, the code image loaded into the instruction memory 740 of each processor 320, 330, 340 could be identical, thus allowing each processor 320, 330, 340 to perform identical algorithms for that one type of input port. In another scenario involving four logical input ports, each with a different type of network interface, the processing algorithms required for each type of network interface could differ. In this case, the forty processors could be allocated as follows: processors [0-9] to port 0, processors [10-19] to port 1, processors [20-29] to port 2 and processors [30-39] to port 3. In addition, four different code images could be downloaded, where each unique image corresponds to a particular input port. In yet another scenario, the NIC 160 may include two logical input ports, each with different processing performance requirements. In such a scenario, one of the input ports may consume 75% of the ingress bus bandwidth and have a packet arrival rate requiring 75% of the processor resources, with the second port accounting for the remainder. To support these performance requirements, thirty processors could be allocated to input port 0 and ten processors to input port 1.

The programming model for NICs 160, 180 that incorporate multiple processors as part of their forwarding engines 220, can be simplified by allocating a single processor to each packet received. Further, and as discussed above, the decreased die size realized by systems that incorporate the present invention allow the inclusion of additional processors in the forwarding engine ASICs of the NICS 160, 180, which thereby ensure that packets can be transmitted at the wire rate of the network 110. The present invention is readily scaleable by adding more processors on a given forwarding engine ASIC, increasing the clock rate of the processors, and by aggregating the processing pools of multiple ASICs. Note that in providing this capability, the hardware architecture of the invention maintains the packet order of the packets arriving via the network interface so that the reintegrated packets can be transmitted out of the forwarding engine in the appropriate order.

The processor pool aggregation technique may be particularly advantageous where the NIC 160 of the communication device 150 receives a packet data stream via the communication network 110 at a line rate that might otherwise overwhelm the processing capabilities of the NIC 160 and result in dropped packets and reduced quality of service. The aggregation technique allows the allocation of idle processors from more than one forwarding engine. For example, the NIC 160 may contain a plurality of forwarding engine ASICs, each with a pool of processor that can be allocated to process packets arriving at any input port on the NIC 160. Alternatively, a pool of processors in additional forwarding engine ASICS, which are present on other NICs 180 within the communication device 150 can be allocated to the NIC 160 that is experiencing the heavy network load.

Although the present invention has been described with reference to specific details, it is not intended that such details should be regarded as limitations upon the scope of the invention, except as and to the extent that they are included in the accompanying claims.

What is claimed is:

1. A method of processing a packet, the method comprising the steps of:
   receiving the packet;
   splitting the packet into a packet header portion and a packet body portion;
   transferring, by an ingress element, the packet header portion to a register file space of a processor without executing an instruction by the processor to load the packet header portion;
   processing the packet header using only instructions stored locally to the processor without invoking at least one of a load instruction and a store instruction by the processor; and
   integrating, by an egress element, the processed packet header with the packet body in an output buffer.

2. The method of claim 1, wherein the transferring step is performed without invoking at least one of a load instruction and a store instruction.

3. The method of claim 1 further comprising the step of:
   transferring the packet header to the register file using a direct register access; and
   transferring the packet body to the output buffer.

4. The method of claim 3 further comprising the steps of:
   selecting an output port for transmission of the packet;
   forwarding the integrated packet from the output buffer to the selected output port for transmission therefrom.

5. The method of claim 1 further comprising the steps of:
   providing a plurality of identical processors executing a common instruction set, each processor storing the instruction set locally to the processor;
   selecting a processor from among the plurality to process the packet header; and
   causing the selected processor to process the packet header.

6. The method of claim 5, wherein the step of selecting the processor is performed by a state machine responsive to the receipt of the packet at an input port.

7. The method of claim 5, wherein the step of causing the selected processor to process the packet header is performed by at least one state machine configured to write the packet header to at least one fixed location in the register file accessible to the selected processor.

8. The method of claim 5, further comprising the step of downloading a common instruction set to an instruction memory in each of the plurality of processors.

9. A packet-processing system for processing a packet received over a communications network, the system comprising:
   an input port configured to receive the packet over the communications network and splitting the packet into a packet header portion and a packet body portion;
   a processor associated with the input port;
   a register file internal to the processor; and
   an ingress element coupled to the input port, processor, and register file, the ingress element being configured to selecting the processor from among a plurality of processors to process the packet header based on availability of the processor, transfer at least one portion of the packet to the register file by invoking a Direct Register Access (DRA) command, wherein the processor processes the at least one portion of the packet in the register file in response to the DRA command and without invoking at least one of a load instruction and a store instruction.

10. The packet-processing system of claim 9, wherein the ingress element is configured to select the processor from a plurality of candidate processors associated with the input port.

11. The packet-processing system of claim 10, further comprising a plurality of instruction memories, each of the plurality of instruction memories being associated with a corresponding one of the plurality of candidate processors, wherein the plurality of instruction memories contain an identical instruction set.

12. The packet-processing system of claim 9, wherein the at least one portion of the packet corresponds to a header of the packet.

13. The packet-processing system of claim 12, wherein the ingress element comprises a state machine configured to write the packet header to a fixed location in the register file.

14. A method of processing a packet stream comprising a temporal sequence of packets, the method comprising the steps of:
providing a plurality of identical processors executing a common instruction set, each processor storing the instruction set locally to the processor;
receiving the packets;
for each packet, (i) identifying a packet header portion of the data packet by splitting the packet into a packet header portion and a packet body portion, (ii) selecting, by an ingress element, a processor from among the plurality to process the packet header based on processor availability, and (iii) causing the selected processor to process the packet header without invoking at least one of a load instruction and a store instruction; and
assembling, by an egress element, the processed packets to reconstruct the packet stream in accordance with the temporal sequence.

15. The method of claim 14 wherein the plurality of processors is physically located on a plurality of integrated circuits.

16. A system for processing a packet stream comprising a temporal sequence of packets, the system comprising:
a plurality of identical processors executing a common instruction set, each processor comprising a local instruction memory containing the instruction set;
an input port for receiving the packets;
an ingress logic unit coupled to the input port and the processors, the ingress logic unit being configured, for each packet, to (i) identify a packet header portion of the data packet by splitting the packet into a packet header portion and a packet body portion and (ii) select a processor from among the plurality to process the packet header based on processor availability, the selected processor responding to the ingress logic unit by processing the packet header without invoking at least one of a load instruction and a store instruction; and
an egress logic unit for assembling the processed packets to reconstruct the packet stream in accordance with the temporal sequence.

17. The system of claim 16 wherein the plurality of processors is physically located on a plurality of integrated circuits.

* * * * *